United States Patent
Williams et al.

(10) Patent No.: US 8,825,234 B2
(45) Date of Patent: Sep. 2, 2014

(54) TURBULENCE MITIGATION FOR TOUCH SCREEN SYSTEMS

(71) Applicant: The Boeing Company, Chicago, IL (US)

(72) Inventors: Jeffrey L. Williams, Parker, CO (US); Susan Anne Foster, Centennial, CO (US); Jason W. Clark, Highlands Ranch, CO (US); Samantha Ann Schwartz, Castle Pines, CO (US); Aaron Daniel Pilcher, Englewood, CO (US)

(73) Assignee: The Boeing Company, Chicago, IL (US)

( * ) Notice: Subject to any disclaimer, the term of this patent is extended or adjusted under 35 U.S.C. 154(b) by 45 days.

(21) Appl. No.: 13/652,104

(22) Filed: Oct. 15, 2012

(65) Prior Publication Data

US 2014/0107871 A1    Apr. 17, 2014

(51) Int. Cl.
*G01C 21/00* (2006.01)
*G01C 21/36* (2006.01)
*G01C 23/00* (2006.01)

(52) U.S. Cl.
CPC .................... *G01C 21/3664* (2013.01)
USPC ............... 701/8; 701/3; 701/4; 701/5; 701/6; 701/7; 701/9; 701/10; 701/11; 701/14; 701/15; 701/16; 701/415; 701/423

(58) Field of Classification Search
CPC ............ G01C 21/365; G01C 21/3664; G01C 21/3667; G01C 21/3688; G01C 23/00; G01C 23/005; G01C 21/20; G01C 21/3492; G05D 1/0607; G05D 1/0623

USPC .................... 701/3–11, 14–16, 415, 423
See application file for complete search history.

(56) References Cited

U.S. PATENT DOCUMENTS

| | | | |
|---|---|---|---|
| 7,489,303 B1* | 2/2009 | Pryor | 345/173 |
| 7,769,501 B2 | 8/2010 | Lusardi et al. | |
| 7,859,392 B2* | 12/2010 | McClellan et al. | 340/441 |
| 8,000,854 B2 | 8/2011 | Majka | |
| 8,209,071 B2 | 6/2012 | Ross | |
| 2001/0045941 A1* | 11/2001 | Rosenberg et al. | 345/161 |
| 2007/0088465 A1* | 4/2007 | Heffington | 701/1 |
| 2007/0118241 A1* | 5/2007 | Rosenberg | 700/94 |
| 2009/0177396 A1* | 7/2009 | Thomassen | 701/213 |
| 2009/0201246 A1* | 8/2009 | Lee et al. | 345/156 |
| 2009/0239581 A1* | 9/2009 | Lee | 455/556.2 |

(Continued)

FOREIGN PATENT DOCUMENTS

| | | |
|---|---|---|
| EP | 2363785 | 9/2011 |
| EP | 2503443 | 9/2012 |

OTHER PUBLICATIONS

PCT Search Report dated Sep. 5, 2013, regarding Application No. PCT/US2013/046015, 8 pages.

*Primary Examiner* — Mary Cheung
*Assistant Examiner* — Atul Trivedi
(74) *Attorney, Agent, or Firm* — Yee & Associates, P.C.

(57) ABSTRACT

A method and apparatus for managing a touch screen system. Data generated by an acceleration detector about acceleration of the touch screen system is received. The acceleration detector is located within the touch screen system. An action is initiated by an input manager when the acceleration of the touch screen system reduces usability of the touch screen system.

20 Claims, 8 Drawing Sheets

(56) References Cited

U.S. PATENT DOCUMENTS

| | | | |
|---|---|---|---|
| 2010/0318294 A1* | 12/2010 | Rosing et al. | 701/220 |
| 2011/0037725 A1* | 2/2011 | Pryor | 345/174 |
| 2011/0082620 A1* | 4/2011 | Small et al. | 701/29 |
| 2011/0257973 A1* | 10/2011 | Chutorash et al. | 704/235 |
| 2012/0216139 A1* | 8/2012 | Ording et al. | 715/773 |
| 2013/0234929 A1* | 9/2013 | Libin | 345/156 |

* cited by examiner

TURBULENCE MITIGATION FOR TOUCH SCREEN SYSTEMS

BACKGROUND INFORMATION

1. Field

The present disclosure relates generally to data processing systems and, in particular, to data processing systems that include touch screen systems. Still more particularly, the present disclosure relates to a method and apparatus for managing a touch screen system based on acceleration of the touch screen system.

2. Background

An aircraft may have many different types of systems used to control the operation of the aircraft. These systems may include hydraulic systems, mechanical systems, and electrical systems.

Electrical systems may include, for example, systems for communications, navigation, flight control, collision avoidance, and other types of systems. Many of the different systems in an aircraft may have a display and physical control used to control the different systems. For example, these controls may include switches, dials, and other suitable types of controls.

In an effort to reduce the amount of space needed in a cockpit for the different electrical systems, different systems may be combined into a single system or may share a display. For example, several flight instruments and controls may be combined into a single display and control system for that display. In this manner, less space may be needed for these systems in the cockpit of an aircraft.

For example, an aircraft may include a primary flight display in which information such as altitude, pitch, roll, and other information about the aircraft may be displayed. As another example, a multifunction display may be present in the aircraft with multiple buttons that may be used to display information in numerous configurable ways. This multifunction display may be used to display information such as a navigation route, a moving map, weather radar information, airport information, and other suitable types of information.

These and other types of information may be displayed on a display in which the operator of the aircraft may interact with a graphical user interface on the display through a user input device. This user input device may include, for example, a keyboard, a mouse, a joystick, a touch screen, and other suitable types of devices. Electronic flight bags (EFBs) and other devices such as tablet computers are using touch screen displays more frequently. In many cases, these displays may be the primary interface for user input.

During certain operating conditions, the ability of an operator to manipulate user input devices such as keys, keyboards, a mouse, or other input devices may become more difficult than desired. For example, some input devices may be more difficult than desired to use during certain maneuvers of the aircraft such as takeoff and landing. In another example, other conditions such as the weather also may make the use of input devices more difficult. Therefore, it would be desirable to have a method and apparatus that takes into account at least some of the issues discussed above, as well as other possible issues.

SUMMARY

In one illustrative embodiment, an apparatus comprises a touch screen system, an acceleration detector located within the touch screen system, and an input manager in communication with the acceleration detector. The acceleration detector is configured to detect acceleration of the touch screen system. The input manager is configured to initiate an action when the acceleration of the touch screen system reduces usability of the touch screen system.

In another illustrative embodiment, a method for managing a touch screen system is present. Data generated by an acceleration detector about acceleration of the touch screen system is received. The acceleration detector is located within the touch screen system. An action is initiated by an input manager when the acceleration of the touch screen system reduces usability of the touch screen system.

In another illustrative embodiment, an aircraft control system comprises a network in an aircraft, data processing systems in the aircraft, a touch screen system, an acceleration detector, and an input manager. The data processing systems are connected to the network and are configured to control operation of the aircraft. The touch screen system is configured display a graphical user interface with a number of controls configured to receive user input for the data processing systems to control the operation of the aircraft. The acceleration detector is located within the touch screen system. The acceleration detector is configured to detect acceleration of the touch screen system. The input manager in communication with the acceleration detector. The input manger is configured to initiate an action when the acceleration of the touch screen system reduces usability of the number of controls displayed in the graphical user interface on the touch screen system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that touch screen systems may further reduce the amount of space needed in a cockpit for different functions. With a touch screen system, input may be generated by a user touching the screen with a digit, stylus, or other suitable input device to generate input to perform various functions. In this manner, space allocated for user input devices such as keys, a keyboard, a mouse, and other input devices may be reduced.

The illustrative embodiments also recognize and take into account that the usability of touch screen systems may be affected by acceleration of those systems. Further, the illustrative embodiments recognize and take into account that touch screen systems may be portable within the aircraft. For example, touch screen systems may take the form of a tablet computer, a portable display device with a touch screen, and other portable forms.

A touch screen system also may take the form of an electronic flight bag (EFB). An electronic flight bag is an electronic information management device that helps flight crews perform tasks more easily and efficiently with less paper. An electronic flight bag may include an aircraft operating manual, a flight crew operating manual, navigation charts, and other suitable types of information. With respect to navigation charts, the electronic flight bag may provide a moving map. Additionally, the electronic flight bag also may provide functions such as performance takeoff calculations or other suitable functions.

The illustrative embodiments also recognize and take into account that these types of touch screen systems and other types of touch screen systems may have reduced usability depending on acceleration of the systems that may occur. For example, during the operation of an aircraft, acceleration of a touch screen system may reduce an ability of an operator to generate desired input.

For example, an operator may be unable to press a desired key depending on the amount of acceleration that occurs with the touch screen system. The acceleration on the touch screen system also may result in the operator pressing an undesired key on the touch screen system.

The illustrative embodiments also recognize and take into account that some sources of acceleration that may affect the ability to use a touch screen system include turbulence that may be encountered by an aircraft. Other sources of acceleration may be from vibrations occurring during takeoff, landing, and other phases of flight.

Thus, the illustrative embodiments provide a method and apparatus for managing a touch screen system. In one illustrative embodiment, an apparatus comprises a touch screen system, an acceleration detector, and an input manager. The acceleration detector is located within the touch screen system. The acceleration detector is configured to detect acceleration of the touch screen system. The input manager is in communication with the acceleration detector and is configured to initiate an action when the acceleration of the touch screen system reduces usability of the touch screen system.

Figure 1:
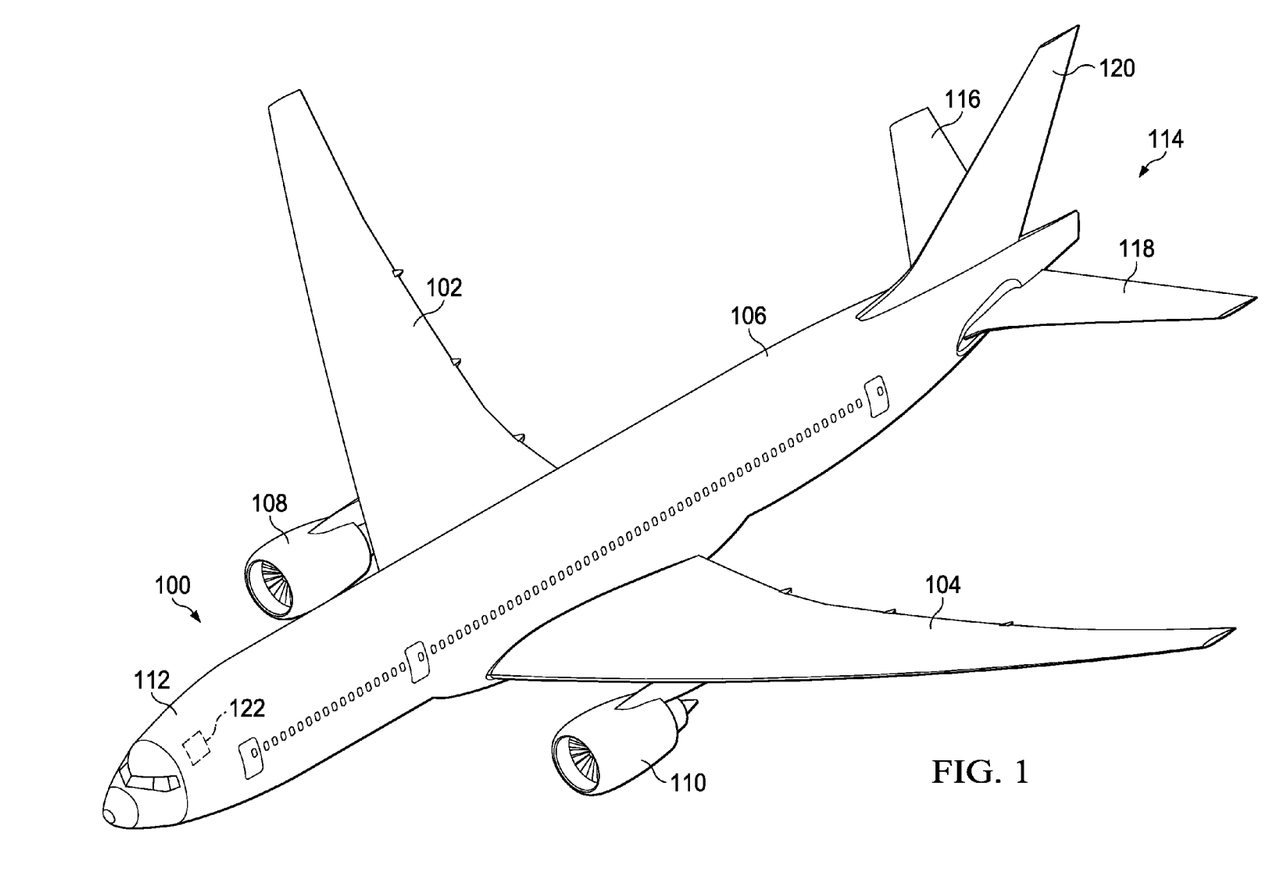
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to fuselage 106. Aircraft 100 includes engine 108 attached to wing 102 and engine 110 attached to wing 104.

Fuselage 106 has nose section 112 and tail section 114. Horizontal stabilizer 116, horizontal stabilizer 118, and vertical stabilizer 120 are attached to tail section 114 of fuselage 106.

In these illustrative examples, aircraft 100 also may include touch screen system 122 within the interior of aircraft 100. Touch screen system 122 is a device that may be used by an operator of aircraft 100 in these illustrative examples.

When touch screen system 122 is implemented in accordance with an illustrative embodiment, acceleration of touch screen system 122 that reduces the usability of touch screen system 122 may be detected by touch screen system 122. In response to detecting acceleration of touch screen system 122 that reduces usability of touch screen system 122, an action may be initiated with respect to touch screen system 122.

Figure 2:
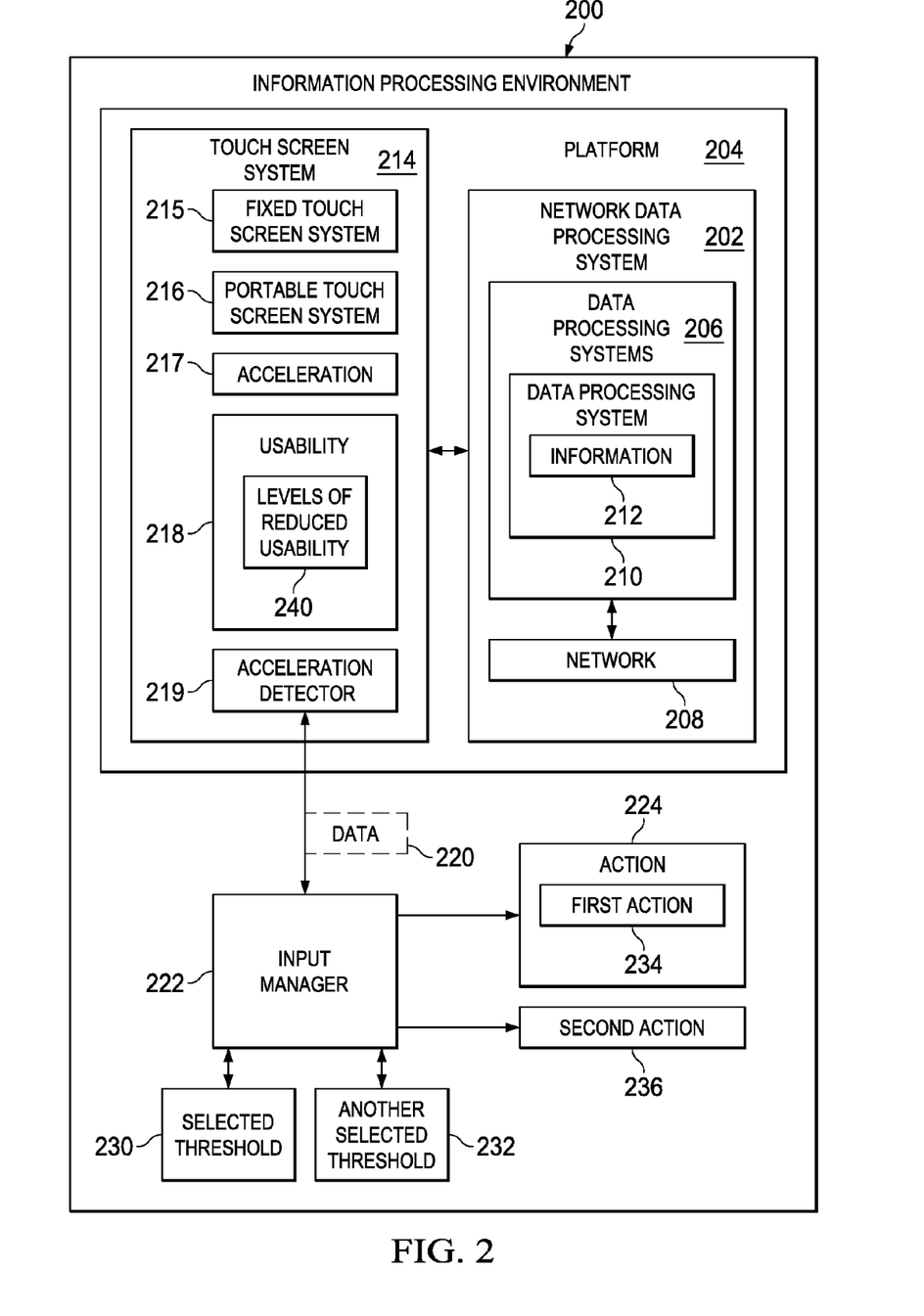
FIG. 2 is an illustration of a block diagram of an information processing environment in accordance with an illustrative embodiment.

Turning now to FIG. 2, an illustration of a block diagram of an information processing environment is depicted in accordance with an illustrative embodiment. In this depicted example, information processing environment 200 may comprise network data processing system 202. Further, network data processing system 202 may be located in platform 204. Aircraft 100 in FIG. 1 is an example of one implementation for platform 204.

In these illustrative examples, network data processing system 202 may include data processing systems 206 and network 208. Data processing systems 206 may be configured to control operation of platform 204. Further data processing system 206 may be configured to monitor platform 204.

As depicted, data processing systems 206 may be connected to network 208. The connection of data processing systems 206 to network 208 may be through wired connections, optical fiber connections, wireless connections, and other suitable types of connections that may provide communication to network 208, data processing systems 206, or a combination of the two.

As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

In these illustrative examples, data processing systems 206 may take various forms. For example, data processing system 210 in data processing systems 206 may be a computer, a line replaceable unit, a flight management system, a navigation computer, an autopilot, a mobile phone, a tablet computer, or some other suitable type of device that may process information. Typically, data processing system 210 may include a processor as well as other components that allow for processing of information 212.

In these illustrative examples, touch screen system 214 also may be present in platform 204. Touch screen system 214 may be configured to receive user input for data processing systems 206 to control operation of platform 204.

Touch screen system 214 may be fixed touch screen system 215 or portable touch screen system 216. When touch screen system 214 takes the form of fixed touch screen system 215, touch screen system 214 may be connected to platform 204. For example, touch screen system 214 may be part of an input and output system implemented in data processing system 210.

When touch screen system 214 takes the form of portable touch screen system 216, touch screen system 214 may be movable by an operator. For example, portable touch screen system 216 may be in communication with data processing system 210 but not physically connected to data processing system 210. For example, portable touch screen system 216 may be selected from one of a tablet computer, a mobile phone, a laptop computer, an electronic flight bag, a portable display device, and some other suitable type of portable device in which touch screen system 214 may be implemented.

The portable device also may be handheld. In one illustrative example, when touch screen system 214 takes the form of a tablet computer, the tablet computer may be an iPad. The iPad is available from Apple, Inc. In another illustrative example, touch screen system 214 may be an electronic flight bag.

As depicted, touch screen system 214 is configured to detect acceleration 217 of touch screen system 214 that reduces usability 218 of touch screen system 214. Usability 218 of touch screen system 214 may be considered to be reduced when information 212 cannot be input or manipulated using touch screen system 214 in a desired manner.

In these illustrative examples, usability 218 may be considered to be reduced when user input from an operator results in increased errors as a result of acceleration 217 to touch screen system 214. In these illustrative examples, acceleration 217 may cause undesired movement to touch screen system 214. In particular, acceleration 217 of touch screen system 214 may have a magnitude and a direction. During a period of time, acceleration 217 may have different magnitudes, different directions or both different magnitudes and different directions.

In these illustrative examples, acceleration 217 may be caused by at least one of vibrations, turbulence, waves, wind, and operation of platform 204. As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C.

For example, acceleration 217 of touch screen system 214 may result from operation of platform 204 when platform 204 is a vehicle, a ship moving in water with waves, a ship moving in water with wind, an aircraft in turbulence, a ground vehicle moving on a rough surface, operation of thrusters on a spacecraft, landing of an aircraft, takeoff of an aircraft, and other sources of acceleration 217.

As depicted, acceleration detector 219 within touch screen system 214 is configured to detect acceleration 217 of touch screen system 214. Acceleration detector 219 may be implemented using various devices. For example, acceleration detector 219 may be implemented using an accelerometer system. The accelerometer system may include one or more accelerometers.

Acceleration detector 219 is configured to generate data 220 based on detection of acceleration 217 of touch screen system 214. Data 220 may include, for example, without limitation, intensity of the acceleration, frequency of movement oscillation, and other suitable types of data. The intensity may be acceleration values measured in g-force.

In these illustrative examples, input manager 222 is configured to receive data 220. Input manager 222 may be implemented using hardware, software, or a combination of the two. When software is used, the operations performed by input manager 222 may be implemented in program code configured to run on a processor unit. When hardware is employed, the hardware may include circuits that operate to perform the operations in input manager 222.

In these illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In the illustrative examples, input manager 222 may be implemented in a number of different locations. For example, input manager 222 may be implemented with at least one of touch screen system 214, network data processing system 202, data processing system 210, and in some other suitable location.

Input manager 222 is configured to determine when acceleration 217 of touch screen system 214 reduces usability 218 of touch screen system 214 using data 220 received from acceleration detector 219. The determination of when acceleration 217 is considered to reduce usability 218 of touch screen system 214 may be made by determining whether acceleration 217 of touch screen system 214 is greater than selected threshold 230. In these illustrative examples, selected threshold 230 may be, for example, an acceleration value measured in $m/s^2$.

Different metrics may be monitored by input manager 222 for comparison to selected threshold 230. For example, input manager 222 may monitor at least one of duration of the vibrations from the oscillations, intensity of the vibrations, frequency of the vibrations, change in intensity, change in frequency, variance in form of observed probability of distribution of events because of the vibrations, and other suitable metrics. These different metrics may be compared to selected threshold 230 for the metric. Additionally, selected threshold 230 also may be selected based on the phase of flight of when platform 204 takes the form of aircraft 100. As a result, selected threshold 230 may be selected for each metric of interest and used to determine whether action 224 should be initiated.

Further, selected threshold 230 may be based on empirical research on the perceived intensity, frequency, duration of turbulence events, and impact on system usability. These tolerances are based on the standard deviation for the events causing the vibrations and may be applied to each of the three axes in which vibrations may occur. In this manner, dynamic monitoring may occur with an ability to change selected threshold 230 during monitoring based on the metrics being monitored and other factors such as phase of flight.

When acceleration 217 of touch screen system 214 is detected such that usability 218 of touch screen system 214 is reduced, input manager 222 initiates action 224. Action 224 may be initiated with respect to touch screen system 214. Action 224 may include at least one of disabling touch screen system 214, generating an alert, enabling voice input, requesting confirmation of an input made to touch screen system 214, and other suitable types of actions. Action 224 may be any action configured to reduce undesired entry of information 212 into touch screen system 214 in these illustrative examples.

Additionally, input manager 222 may continue to receive data 220 about acceleration 217 of touch screen system 214 generated by acceleration detector 219. Using data 220, input manager 222 may determine whether acceleration 217 no longer reduces usability 218 of touch screen system 214. This determination may be made by comparing acceleration 217 to selected threshold 230. In some illustrative examples, acceleration 217 may be compared to another selected threshold 232 rather than selected threshold 230. In other words, the threshold used to determine when usability 218 of touch screen system 214 is no longer reduced may be different from the threshold used to determine when usability 218 of touch screen system 214 is reduced.

In these illustrative examples, action 224 may be first action 234. When input manager 222 determines usability 218 of touch screen system 214 is no longer reduced, input manager 222 may initiate second action 236. Second action 236 may reverse action 224 in these illustrative examples. For example, second action 236 may include at least one of enabling touch screen system 214 and disabling requesting confirmation of an input made to touch screen system 214.

Further, in some illustrative examples, usability 218 may have levels of reduced usability 240. As input manager 222 detects a reduction in usability 218 of touch screen system 214, this reduction in usability 218 may be identified as a level within levels of reduced usability 240.

In other words, input manager 222, is configured to determine a level of reduced usability in levels of reduced usability 240 for touch screen system 214. Additionally, input manager 222 is configured to initiate action 224 based on the level of reduced usability in levels of reduced usability 240 identified for touch screen system 214.

Each time a different level of reduce usability is identified in levels of reduced usability 240, action 224 may be initiated. In other words, as the reduction in usability 218 of touch screen system 214 is identified, additional actions may be initiated. For example, one level in levels of reduced usability 240 may result in action 224 taking the form of generating an alert. A greater level of reduced usability in levels of reduced usability 240 may result in requesting confirmation of input to touch screen system 214. An even greater level of reduced usability in levels of reduced usability 240 may result in disabling touch screen system 214.

Figure 3:
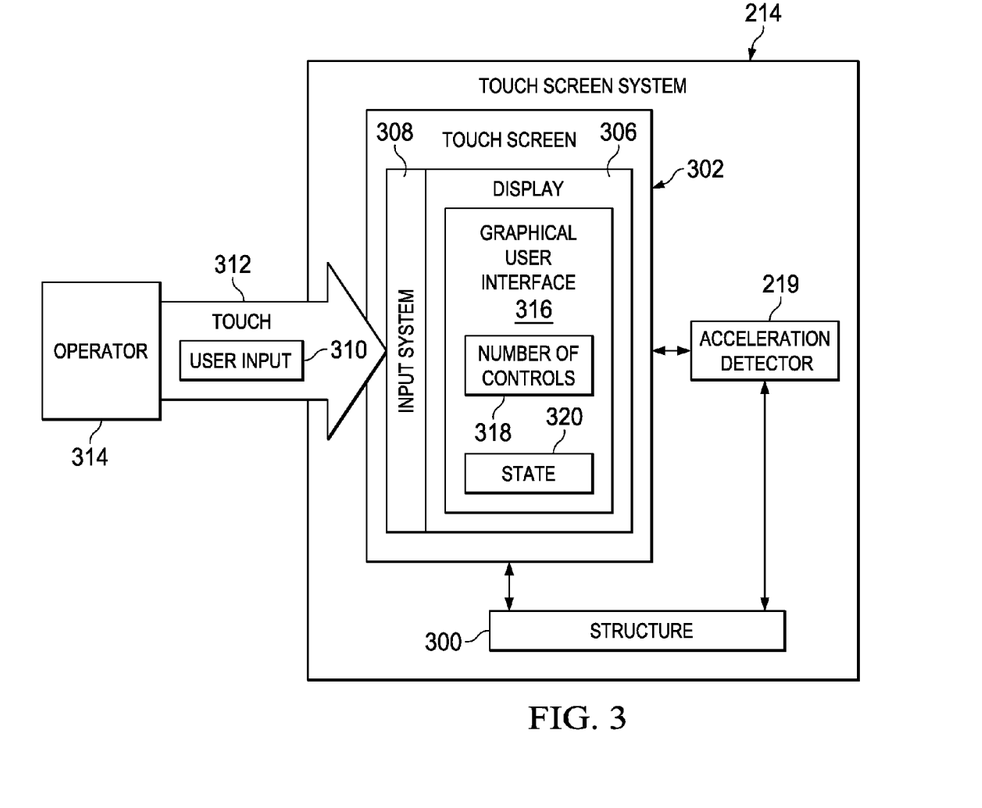
FIG. 3 is an illustration of a block diagram of a touch screen system in accordance with an illustrative embodiment.

Turning now to FIG. 3, an illustration of a block diagram of a touch screen system is depicted in accordance with an illustrative embodiment. In this depicted example, a number of different components are illustrated for touch screen system 214. As depicted, touch screen system 214 comprises structure 300, touch screen 302, and acceleration detector 219.

In these illustrative examples, structure 300 may take various forms. For example, structure 300 may be a housing, a frame, a panel, or some other suitable type of structure.

Touch screen 302 is associated with structure 300. When one component is "associated" with another component, the association is a physical association in the depicted examples. For example, a first component, touch screen 302, may be considered to be associated with a second component, structure 300, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

Touch screen 302 is a physical device and includes display 306 and input system 308. In these illustrative examples, touch screen 302 is an electronic display that is also configured to detect the presence and location of a touch within display 306 using input system 308.

Display 306 may be implemented using a number of different types of display devices. For example, display 306 may be a liquid crystal display, a light emitting diode display, or other suitable types of display devices.

Input system 308 is configured to be placed in association with display 306 such that user input 310 may be generated in response to touch 312 by operator 314. In these illustrative examples, user input 310 may be made to input system 308 to control operation of platform 204, which may be, for example, aircraft 100.

In these illustrative examples, operator 314 is a human operator. Touch 312 may be generated by operator 314 touching input system 308 on display 306 with a digit. In other illustrative examples, touch 312 may be generated by operator 314 manipulating a stylus or other device to touch input system 308 on display 306.

In these illustrative examples, graphical user interface 316 may be displayed on display 306 on touch screen 302. Graphical user interface 316 may be an interface to a program. The program maybe, for example, a program in a navigation system, an autopilot, an environmental control system, an in-flight entertainment system, a weather information system, and other suitable types of systems in network data processing system 202 in FIG. 2.

In these illustrative examples, number of controls 318 may be displayed on graphical user interface 316. Number of controls 318 is a number of graphical controls that may be used to generate user input to enter information, manipulate information, or perform other operations on information. User input 310 in touch screen system 214 may be to manipulate number of controls 318 displayed in graphical user interface 316 to control operation of aircraft 100.

As used herein, a "number of" when used with reference to items means one or more items. For example, number of controls 318 is one or more controls.

Number of controls 318 may take various forms. For example, number of controls 318 may be at least one of a button, a key, a slider, a dial, a check box, a keyboard, and other suitable types of controls. In these illustrative examples, acceleration detector 219 may be associated with at least one of touch screen 302 and structure 300.

As depicted, selected threshold 230 used by input manager 222 in FIG. 2 to determine when touch screen system 214 has reduced usability may be selected based on graphical user interface 316. In other words, when graphical user interface 316 changes to a different graphical user interface or is modified, selected threshold 230 also may change. This change may take into account number of controls 318 present in graphical user interface 316 as well as the shape and size of number of controls 318. As number of controls 318 change, graphical user interface 316 is considered to change in a manner that may result in the use of a different value for selected threshold 230.

In these illustrative examples, action 224 in FIG. 2 with respect to graphical user interface 316 may include changing state 320 for graphical user interface 316. Changing state 320 for graphical user interface 316 may include disabling graphical user interface 316, reducing a functionality of graphical user interface 316 displayed on touch screen 302, disabling a portion of number of controls 318, changing a size of at least a portion for number of controls 318, changing functionality for the portion of number of controls 318, and other suitable changes to state 320 for graphical user interface 316. As depicted, the portion of number of controls 318 may be some or all of number of controls 318. Second action 236 in FIG. 2 with respect to graphical user interface 316 may include at least one of increasing a functionality of graphical user interface 316 to an original level, returning a size of number of controls 318 in graphical user interface 316 to an original size, and other suitable actions.

Acceleration detector 219 may be connected to at least one of touch screen 302 and structure 300 in a manner such that acceleration detector 219 detects acceleration 217 in FIG. 2 of touch screen 302 in touch screen system 214. By including acceleration detector 219 within touch screen system 214, the detection of acceleration 217 is actually for touch screen 302 rather than other components that may be present in platform 204 in FIG. 2.

In other words, acceleration detector 219 detects acceleration 217 in FIG. 2 for touch screen 302 in touch screen system 214 rather than for other components or structures in platform 204. This type of detection may be useful in detecting acceleration 217 of touch screen 302 when touch screen system 214 is not connected to another structure or system in platform 204 in FIG. 2. In other words, acceleration detector 219 may be configured to detect acceleration 217 of touch screen 302 rather than other components that may not be connected to touch screen 302. In this manner, data 220 in FIG. 2 generated by acceleration detector 219 may more accurately reflect acceleration 217 of touch screen 302 for use in determining when usability 218 of touch screen 302 in touch screen system 214 is reduced.

In some illustrative examples, acceleration detector 219 may be located within structure 300. For example, when touch screen system 214 takes the form of a tablet computer such as, for example, without limitation, an iPad, acceleration detector 219 is located within structure 300 which may take the form of a housing. In another example, when touch screen system 214 takes the form of an electronic flight bag, acceleration detector 219 is also located within the housing for the electronic flight bag. In this manner, accelerations detected by acceleration detector 219 are those of the tablet computer or the electronic flight bag rather than other components or structures in a platform such as an aircraft.

The illustration of information processing environment 200 and the different components in FIG. 2 and FIG. 3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, data processing system 210 may not be connected to network 208 and may be a separate component that does not interact with other data processing systems in data processing systems 206 in network data processing system 202. In another illustrative example, touch screen system 214 also may include a processor unit and may be configured to process information 212. When touch screen system 214 includes the processor unit, touch screen system 214 may be a data processing system and not just a display with an input system.

Figure 4:
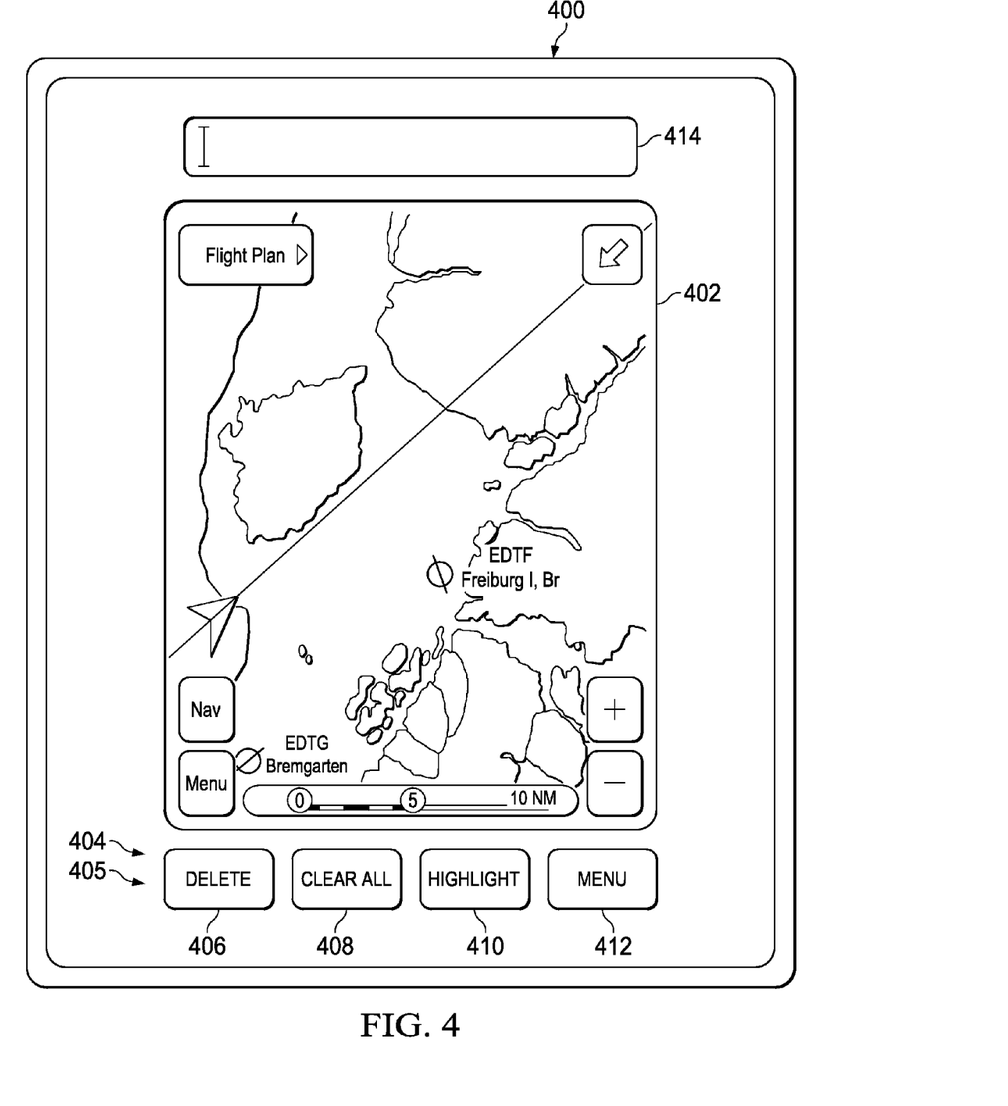
FIG. 4 is an illustration of a graphical user interface in accordance with an illustrative embodiment.
Figure 5:
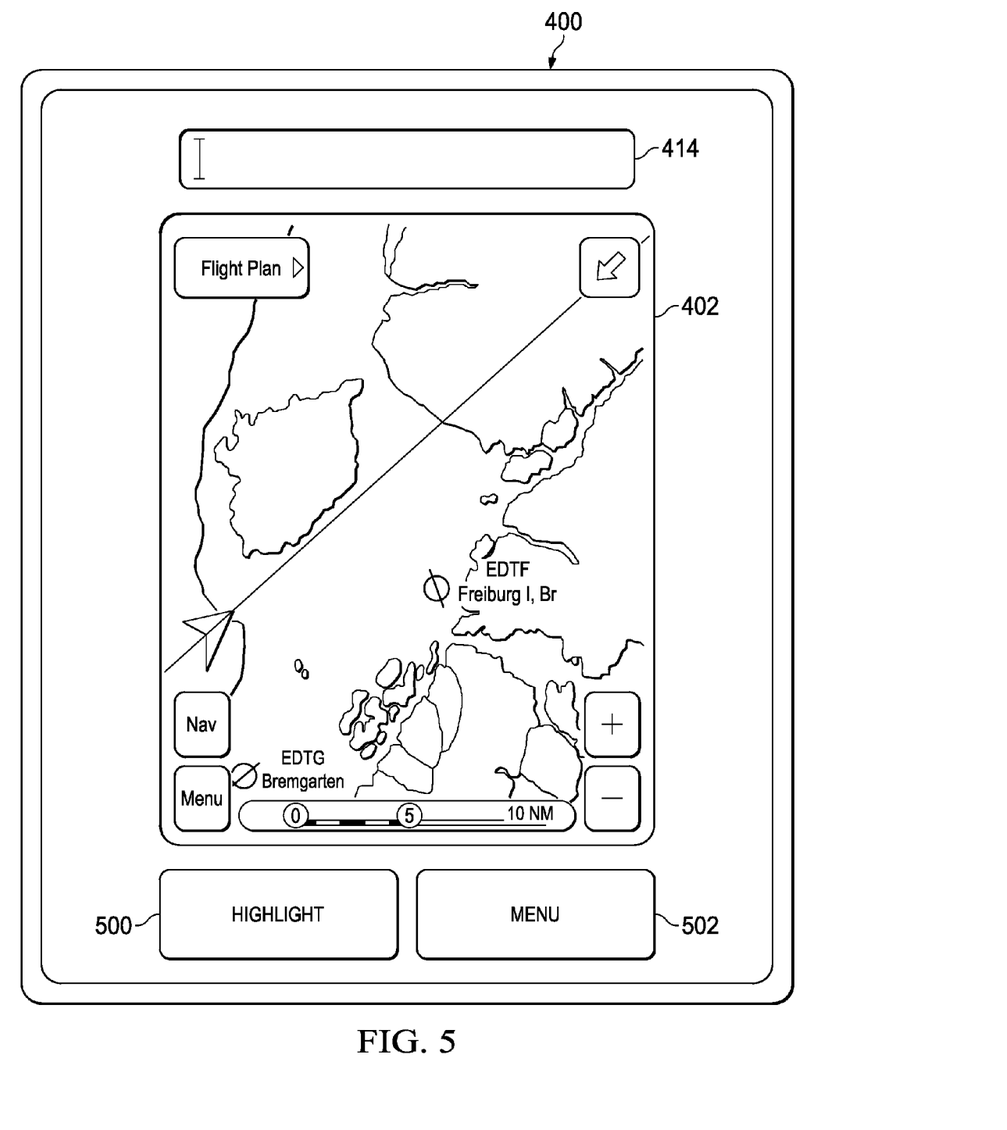
FIG. 5 is another illustration of a graphical user interface with a change in controls in accordance with an illustrative embodiment.
Figure 6:
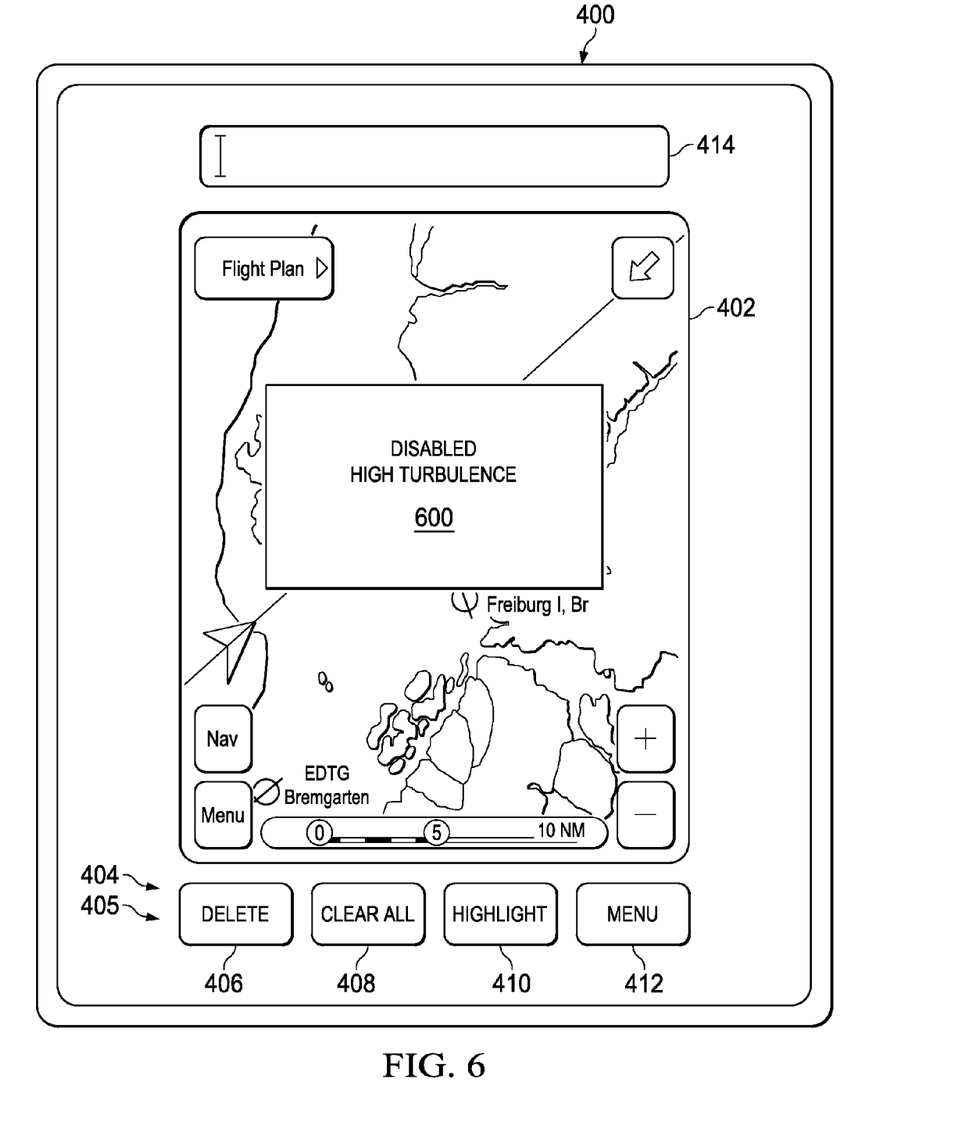
FIG. 6 is an illustration of a disabled graphical user interface in accordance with an illustrative embodiment.

FIGS. 4-6 are illustrations of a graphical user interface on which actions may be taken when acceleration of a touch screen system reduces the usability of the touch screen system. Turning first to FIG. 4, an illustration of a graphical user interface is depicted in accordance with an illustrative embodiment. In this depicted example, graphical user interface 400 is an example of one implementation for graphical user interface 316 as shown in block form in FIG. 3.

Graphical user interface 400 is an example of a graphical user interface on which an action may be taken when acceleration 217 is detected on touch screen system 214 that reduces usability 218 of touch screen system 214 in FIG. 2. In particular, the acceleration on the touch screen system reduces usability 218 of touch screen system 214 by reducing the ability of operator 314 to enter user input 310 in FIG. 3 into graphical user interface 400.

In this illustrative example, graphical user interface 400 displays map 402 with number of controls 404. Number of controls 404 is a number of graphical controls displayed in graphical user interface 400. In this example, number of controls 404 takes the form of buttons 405. As depicted, number of controls 404 includes control 406, control 408, control 410, and control 412.

As depicted, control 406 is a "delete" button, control 408 is a "clear all" button, control 410 is a "highlight" button, and control 412 is a "menu" button. Control 406 may delete input in field 414 or may delete a last action that has occurred in map 402. Control 408 may clear all input made to map 402. Control 410 may highlight portions of map 402. Control 412 may display a menu with other functions or controls on map 402.

With reference now to FIG. 5, an illustration of a graphical user interface with a change in controls is depicted in accordance with an illustrative embodiment. In this illustrative example, number of controls 404 has been changed to include only a portion of number of controls 404 present in graphical user interface 400 in FIG. 4.

In this illustrative example, number of controls 404 includes control 500 and control 502. Control 500 is a "highlight" button and control 502 is a "menu" button. Controls for delete and clear have been removed in graphical user interface 400. The controls for deleting and clearing all have been omitted in graphical user interface 400 because of acceleration 217 of touch screen system 214 in FIG. 2 including graphical user interface 400. These controls are removed to prevent an unintended deletion or clearing of information from graphical user interface 400.

As depicted, control 500 and control 502 have been increased in size with graphical user interface 400. This change of control 500 for highlighting and control 502 for displaying the menu occurs to increase the likelihood that these controls may be selected even though acceleration is present in touch screen system 214. In other words, the change in graphical user interface 400 is performed to increase usability 218 of touch screen system 214 in which graphical user interface 400 is displayed.

Turning now to FIG. 6, an illustration of a disabled graphical user interface is depicted in accordance with an illustrative embodiment. In this illustrative example, graphical user interface 400 is disabled in view of the acceleration that reduces usability 218 of touch screen system 214 in FIG. 2. In this illustrative example, alert 600 is displayed to indicate that graphical user interface 400 has been disabled. In this illustrative example, alert 600 is displayed as a pop-up window in graphical user interface 400.

Alert 600 states "disabled high turbulence" to indicate to operator 314 in FIG. 3 that graphical user interface 400 cannot be used at the present time. In particular, graphical user interface 400 may be disabled by disabling an ability of a user to manipulate controls 404. In other words, controls 404 are disabled. In some illustrative examples, the user may be provided with an option to override the disablement of controls 404.

The illustration of graphical user interface 400 in FIGS. 4-6 is not meant to limit the manner in which actions may be taken on a graphical user interface. These illustrations are only meant to be illustrative examples rather than limiting examples. For example, in other illustrative examples, graphical user interface 400 may request confirmation of the selection of one or more of number of controls 404. In still other illustrative examples, other types of controls other than buttons 405 may be present. For example, other types of controls that may be used in addition to or in place of buttons 405 may include sliders, dials, and other suitable types of controls. In another illustrative example, user input may be received using voice commands in addition to or in place of number of controls 404 on graphical user interface 400. These voice commands may be used to perform functions such as zoom functions, switching applications, entering commands, and other suitable functions.

Figure 7:
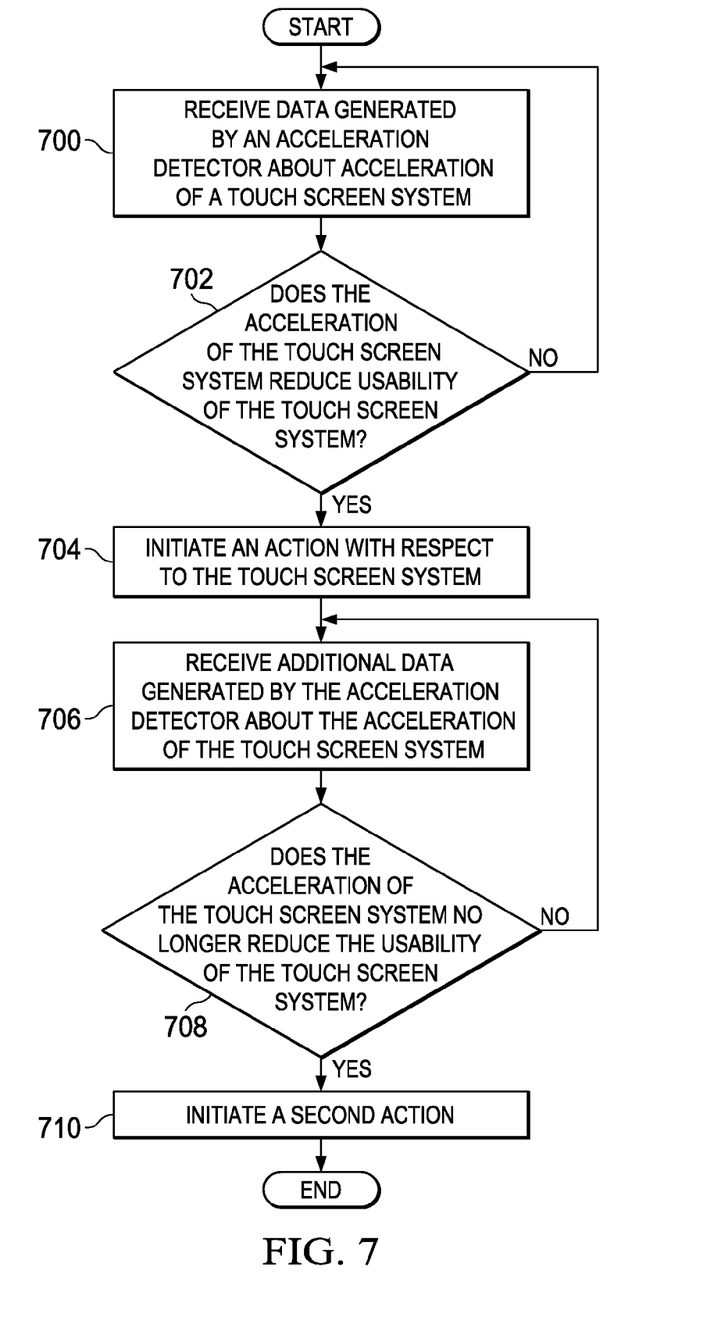
FIG. 7 is an illustration of a flowchart of a process for managing a touch screen system in accordance with an illustrative embodiment.

With reference now to FIG. 7, an illustration of a flowchart of a process for managing a touch screen system is depicted in accordance with an illustrative embodiment. The process illustrated in FIG. 7 may be implemented in information processing environment 200 in FIG. 2. In particular, the process may be implemented to manage touch screen system 214 in FIG. 2. Further, the process may be implemented within input manager 222 in FIG. 2.

The process begins by receiving data generated by an acceleration detector about acceleration of a touch screen system (operation 700). In this illustrative example, the acceleration detector is located within the touch screen system.

A determination is made as to whether the acceleration of the touch screen system reduces usability of the touch screen system using the data (operation 702). In operation 702, a level of reduced usability of the touch screen system may be identified.

If the acceleration reduces the usability of the touch screen system, an action is initiated with respect to the touch screen system (operation 704). In operation 704, the action selected may be based on the level of reduced usability identified for the touch screen system. In operation 704, the action may place the touchscreen system into an alternate mode from the normal mode in which the touchscreen system operates.

The process receives additional data generated by the acceleration detector about the acceleration of the touch screen system (operation 706). A determination is made as to whether the acceleration of the touch screen system no longer reduces the usability of the touch screen system (operation 708). If the acceleration of the touch screen system no longer reduces the usability of the touch screen, a second action is initiated (operation 710) with the process terminating thereafter.

With reference again to operation 702, if the acceleration of the touch screen system does not reduce the usability of the touch screen system, the process returns to operation 700 as described above. Turning back to operation 708, if the acceleration of the touch screen system still reduces the usability of the touch screen system, the process returns to operation 706 as described above.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, the process in FIG. 7 may include operations that allow changing between a normal mode and an alternate mode. The modes of operation may be changed by the operator in the illustrative examples.

Figure 8:
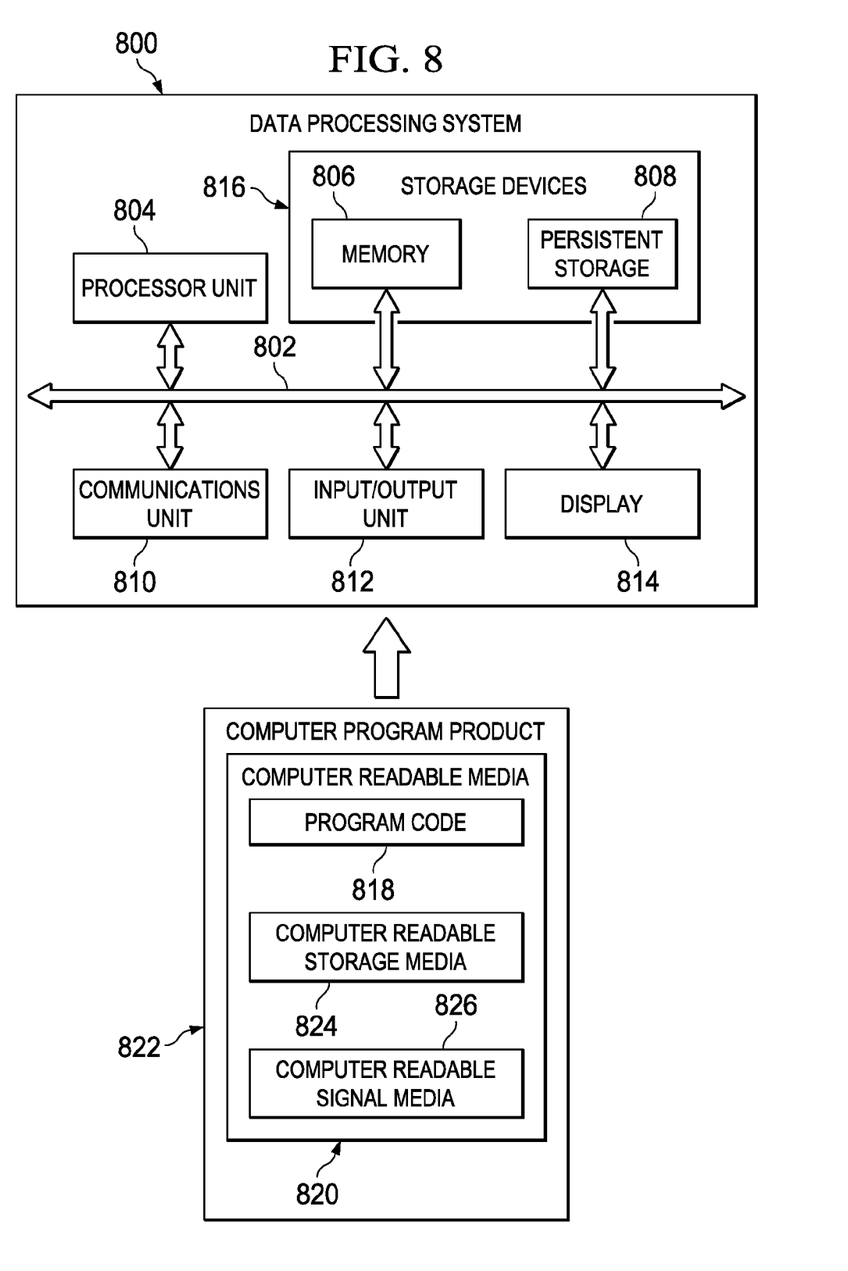
FIG. 8 is an illustration of a block diagram of a data processing system in accordance with an illustrative embodiment.

Turning now to FIG. 8, an illustration of a block diagram of a data processing system is depicted in accordance with an illustrative embodiment. Data processing system 800 may be used to implement data processing systems 206, data processing system 210, touch screen system 214, and other suitable devices in information processing environment 200 in FIG. 2.

In this illustrative example, data processing system 800 includes communications framework 802, which provides communications between processor unit 804, memory 806, persistent storage 808, communications unit 810, input/output unit 812, and display 814. In this example, communication framework may take the form of a bus system.

Processor unit 804 serves to execute instructions for software that may be loaded into memory 806. Processor unit 804 may be a number of processors, a multi-processor core, or some other type of processor, depending on the particular implementation.

Memory 806 and persistent storage 808 are examples of storage devices 816. A storage device is any piece of hardware that is capable of storing information, such as, for example, without limitation, data, program code in functional form, and/or other suitable information either on a temporary basis and/or a permanent basis. Storage devices 816 may also be referred to as computer readable storage devices in these illustrative examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through a keyboard, a mouse, and/or some other suitable input device. Further, input/output unit 812 may send output to a printer. Display 814 provides a mechanism to display information to a user.

Instructions for the operating system, applications, and/or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these illustrative examples. In one example, computer readable media 820 may be computer readable storage media 824 or computer readable signal media 826.

In these illustrative examples, computer readable storage media 824 is a physical or tangible storage device used to store program code 818 rather than a medium that propagates or transmits program code 818.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 800 are not meant to provide architectural limitations to the manner in which different embodiments may be implemented. The different illustrative embodiments may be implemented in a data processing system including components in addition to and/or in place of those illustrated for data processing system 800. Other components shown in FIG. 8 can be varied from the illustrative examples shown. The different embodiments may be implemented using any hardware device or system capable of running program code 818.

Thus, one or more illustrative embodiments provide a method and apparatus for managing a touch screen system. With an input manager such as input manger 222 in FIG. 2, the operation of the touch screen system may be managed to reduce undesired input of information into the touch screen system. In these illustrative examples, the detection of acceleration of the touch screen system is made by a device associated with the touch screen system rather than a device that may be located elsewhere in a platform. In this manner, when the touch screen system is a display, a tablet PC, a mobile device, or some other portable device, acceleration of the touch screen system that reduces usability of the touch screen system may be managed to avoid undesired inputs into the touch screen system. In this manner, one or more illustrative embodiments may provide greater accuracy in the entry of information into network data processing systems or data processing systems in a platform. In this manner, more reliable use of a platform may occur with less errors or undesired results.

Further the illustrative embodiments may be applied to the use of touch screen systems in other types of platforms other than aircraft 100. For example, the platform may be a mobile platform, a stationary platform, a land-based structure, an aquatic-based structure, and a space-based structure. More specifically, the platform, may be a surface ship, a tank, a personnel carrier, a train, a spacecraft, a space station, a satellite, a submarine, an automobile, a power plant, a bridge, a dam, a house, a manufacturing facility, a building, and other suitable platforms in which acceleration may occur with respect to touch screen systems in the platforms that reduce usability of the touch screen systems in those platforms.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a touch screen system configured to display a user interface and receive user input for controlling operation of an aircraft;
    an acceleration detector located within the touch screen system, wherein the acceleration detector is configured to detect acceleration of the touch screen system; and
    an input manager in communication with the acceleration detector and configured to initiate an action when the acceleration of the touch screen system reduces usability of the touch screen system.

2. The apparatus of claim 1, wherein the acceleration detector is configured to generate data about the acceleration of the touch screen system and the input manager is configured to receive data from the acceleration detector and determine when the acceleration of the touch screen system reduces the usability of the touch screen system using the data.

3. The apparatus of claim 1, wherein the acceleration reduces the usability of the touch screen system when the acceleration of the touch screen system has a magnitude that is greater than a selected threshold.

4. The apparatus of claim 3, wherein the selected threshold is based on a graphical user interface displayed on the touch screen system.

5. The apparatus of claim 1, wherein the action is selected from at least one of disabling the touch screen system, generating an alert, and requesting confirmation of an input made to the touch screen system.

6. The apparatus of claim 1, wherein the action is a first action and wherein the input manager is configured to initiate a second action when the acceleration of the touch screen system no longer reduces the usability of the touch screen system.

7. The apparatus of claim 6, wherein the second action is selected from at least one of enabling the touch screen system, increasing a functionality of a graphical user interface to an original level, and returning a size of a number of controls in the graphical user interface to an original size.

8. The apparatus of claim 1, wherein the input manager is configured to determine a level of reduced usability of the touch screen system and initiate the action based on the level of reduced usability of the touch screen system.

9. The apparatus of claim 1, wherein the acceleration is caused by vibrations caused by the operation of the aircraft.

10. The apparatus of claim 1, wherein the touch screen system is selected from one of a flight management system and an autopilot.

11. A method for managing a touch screen system, the method comprising:

receiving data generated by an acceleration detector about acceleration of the touch screen system, wherein the acceleration detector is located within the touch screen system and the touch screen system is configured to display a user interface and receive user input for controlling operation of an aircraft; and initiating, by an input manager, an action when the acceleration of the touch screen system reduces usability of the touch screen system.

12. The method of claim 11 further comprising:

determining, by the input manager, when the acceleration of the touch screen system reduces the usability of the touch screen system using the data.

13. The method of claim 11, wherein the acceleration reduces the usability of the touch screen system when the acceleration of the touch screen system has a magnitude that is greater than a selected threshold.

14. The method of claim 13, wherein the selected threshold is based on a graphical user interface displayed on the touch screen system.

15. The method of claim 11, wherein the action is selected from at least one of disabling the touch screen system, generating an alert, and requesting confirmation of an input made to the touch screen system.

16. The method of claim 11, wherein the action is a first action and wherein the input manager is configured to initiate a second action when the acceleration of the touch screen system no longer reduces the usability of the touch screen system.

17. The method of claim 16, wherein the second action is selected from at least one of enabling the touch screen system, increasing a functionality of a graphical user interface to an original level, and returning a size of controls in the graphical user interface to an original size.

18. The method of claim 11, wherein the acceleration detector is an accelerometer system.

19. The method of claim 11, wherein the acceleration is caused by at least one of vibrations caused by the operation of the aircraft, the aircraft in turbulence, landing of the aircraft, and takeoff of the aircraft.

20. An aircraft control system comprising:

a network in an aircraft;

data processing systems in the aircraft, wherein the data processing systems are connected to the network and are configured to control operation of the aircraft;

a touch screen system configured to display a graphical user interface with a number of controls configured to receive user input for the data processing systems to control the operation of the aircraft;

an acceleration detector located within the touch screen system, wherein the acceleration detector is configured to detect acceleration of the touch screen system; and an input manager in communication with the acceleration detector and configured to initiate an action when the acceleration of the touch screen system reduces usability of the number of controls displayed in the graphical user interface on the touch screen system.

* * * * *